April 12, 1966    M. R. GATHERIDGE    3,245,664
SPIGOT MOUNTED MIXER

Filed Sept. 11, 1964    2 Sheets-Sheet 1

INVENTOR.
MARVIN R. GATHERIDGE

BY Lockwood, Woodard, Smith & Weikart
Attorneys

INVENTOR.
MARVIN R. GATHERIDGE

United States Patent Office 3,245,664
Patented Apr. 12, 1966

3,245,664
SPIGOT MOUNTED MIXER
Marvin R. Gatheridge, Indianapolis, Ind., assignor to General Equipment Mfg. & Sales, Inc., a corporation of Indiana
Filed Sept. 11, 1964, Ser. No. 395,754
4 Claims. (Cl. 259—22)

This invention relates generally to mixing devices for blending flavoring or pigments with relatively viscous fluids and in particular to a mixing device for mixing flavoring with a relatively viscous milk shake or malted milk base at the point of exit of the base liquid from a spigot and in the serving container.

In the serving of frozen semi-liquid products such as milk shakes from machines of the type disclosed in U.S. Patent 3,013,398 it is, of course desirable to offer a choice of several flavors. While high volume serving locations may justify the expense of a separate mix machine for each flavor, low volume installations do not, and it has recently become customary to inject the proper amount of flavoring into the serving container (usually a paper cup) and then mix the flavoring with the viscous base mix as the mix enters the container from the mix machine spigot.

This procedure has encountered difficulties because it requires that the relatively viscous semi-frozen mix must be rapidly and uniformly mixed with a small amount of viscous flavoring liquid and the timing of the operating period of the mixer must be correct to produce the desired consistency and homogeneity of the flavored product.

It is an object of the present invention to provide an impeller for a motor driven mixer which is effective to rapidly and uniformly mix or blend a liquid, such as a flavoring, with a very viscous base liquid within a small container such as a milk shake serving cup.

A further object of the present invention is to provide a switching sequence for energizing a spigot mounted, motor operated mixer which retains the mixer in operation for an adjustable time interval subsequent to closure of the spigot delivering the base liquid to the mixer impeller.

These and other objects will become apparent as the description proceeds with reference to the accompanying drawings in which.

Figure 1:
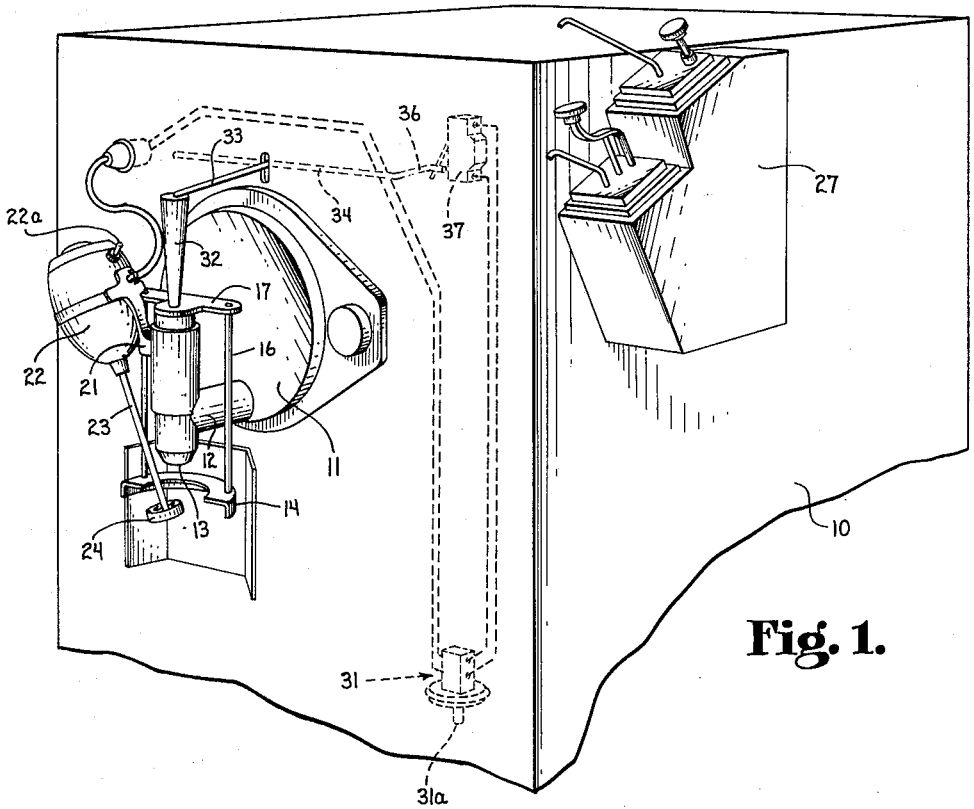
FIG. 1 is a perspective, fragmentary view of a milk shake dispensing machine having the apparatus of the present invention incorporated therein.
Figure 2:
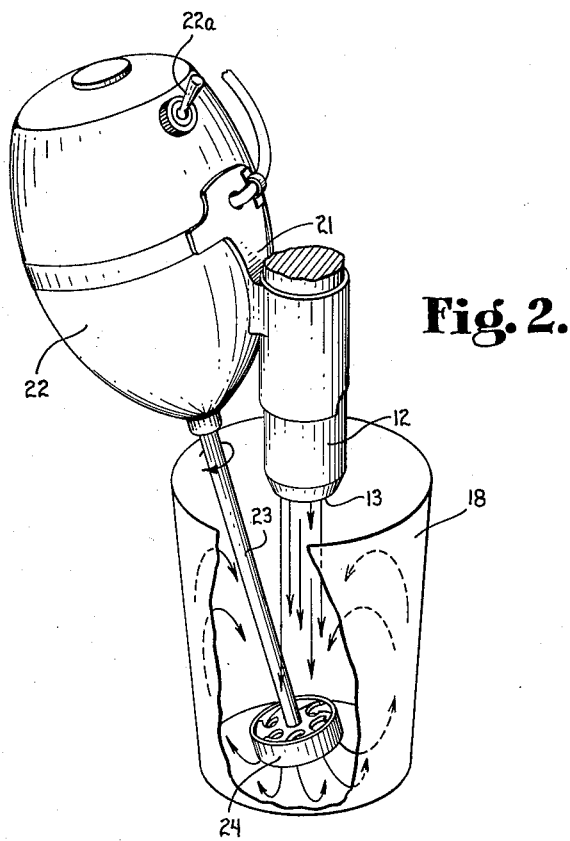
FIG. 2 is an enlarged, perspective view showing the impeller of the present invention in operation within a container.

Referring initially to FIGS. 1 and 2, there is shown an outer housing 10 enclosing the thermally insulated evaporator chamber, the front plate of which is indicated at 11. Extending from the front plate 11 is a spigot 12 having a discharge opening at 13. An arcuate, cup locating plate 14 is connected by means of rods 16 to a plate 17 which, when moved upwardly, opens the spigot 12 and permits the frozen product to be discharged through the aperture 13. It will be understood that the rim of a cup (indicated at 18 in FIG. 2) may be engaged against the underface of the plate 14 and moved upwardly to permit the product discharged from the spigot 12 to enter the cup.

Mounted on the spigot by means of a bracket 21 is a mixer motor 22 having a shaft 23. The end of the shaft carries a mixer button or impeller 24. The mixer motor is mounted so that the impeller 24 is located directly below the discharge aperture 13 of the spigot. Suitable flavoring from the syrup supply containers, indicated at 27 in FIG. 1, may be injected into the cup 18 and the cup may then be utilized to actuate the spigot 13 to open position so that the product may enter the cup from above the impeller and be mixed by the impeller with the flavoring syrup.

As may be seen in FIG. 1, the mixer motor 22 is electrically connected to a time delay relay indicated generally at 31 in FIG. 1. While the time delay relay may be any one of several conventional types, the relay 31 herein disclosed is a commercially available time delay relay identified as a solenoid operated time switch model 701–112, manufactured by Controls Company of America, Schiller Park, Illinois. The time delay is accomplished by the venting of a pneumatic chamber (through the vent 31a), permitting the relay contacts to open a time interval after the deenergization of the solenoid. The time interval is adjustable by adjustment of the size of the vent 31a which determines the time needed to expel air from the pneumatic chamber. It will be understood that the specific construction of the solenoid operated time delay switch does not form a part of the present invention. Extending upward, from the plate 17 is a switch actuator 32 whose upper end engages a lever 33. The lever 33 extends through an aperture in the front face of the housing 10 and is rigidly secured to a rod 34 mounted for axial rotation within the housing 10. From the FIG. 1 it will be evident that upward motion of the actuator 32 rocks the lever 33 so as to rotate the rod 34 axially thus moving the arm 36, extending from the rod 34, permitting the normally open spigot switch 37 to move to closed position.

Figure 5:
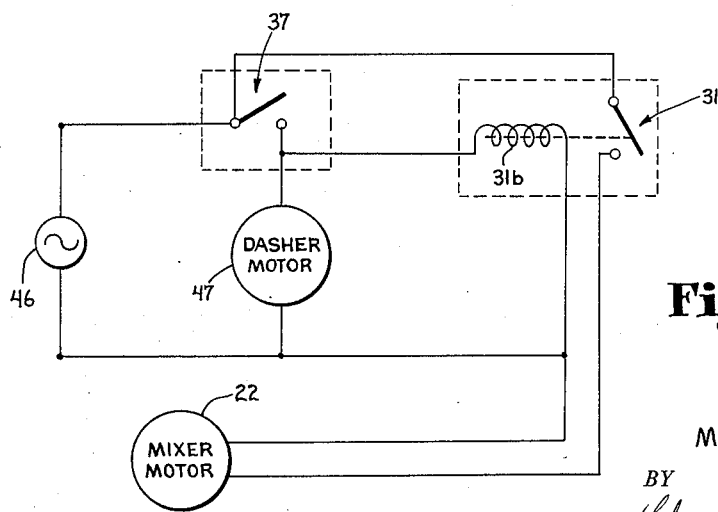
FIG. 5 is a schematic illustration of the circuit used in controlling the mixer motor.

The operation of the circuit components may be explained with reference to FIG. 5. As there illustrated the mixer motor 22 is connected across a source of power, indicated schematically at 46, through the spigot switch 37. A dasher motor is indicated at 47 in FIG. 5, this motor being the drive for the agitator or dasher within the evaporator chamber enclosed by the housing 10 and which serves as a delivery means for providing a discharge pressure on the product sufficient to drive it through the open spigot 12. The solenoid coil component of the time delay relay 31 is identified at 31b. From FIG. 5 it will be evident that upon closure of the spigot switch 37, brought about by opening of the spigot, the dasher motor 47 will be started and the solenoid 31b will be energized to close the switch 31. This provides a circiut to the mixer motor 22 which by-passes the spigot switch 37. Upon closure of the spigot 12 and consequent opening of the spigot switch 37 and deenergization of solenoid coil 31b, the mixer motor will remain energized for the period of time required to expel the air from the pneumatic chamber of the relay and open switch 31.

Figure 3:
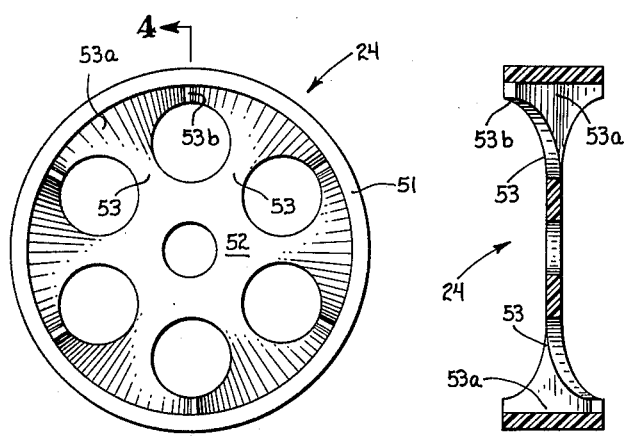
FIG. 3 is a top plan view of the impeller of the present invention.
Figure 4:
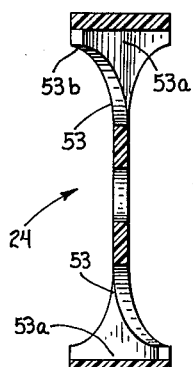
FIG. 4 is a sectional view of the impeller taken generally along the line 4—4 of FIG. 3.

The impeller itself, identified at 24, will now be described in detail with reference to FIGS. 2, 3, and 4. The impeller 24 comprises a cylindrical rim member 51 whose central axis defines the axis of rotation of the impeller, this coinciding with the axis of rotation of the shaft 23. The impeller further includes a central spider member 52 having a series of radially extending legs 53 centered within the rim member 51. The outer tips of the legs 53 are rigidly joined to the rim member 51 by any suitable means or, as an alternate, the rim member may be cast of suitable plastic or metallic material integrally with the rim member. Each of the legs 53 has its outer portion 53a skewed or tilted out of the plane of the central portion of the spider 52 so that the lines of intersection of the tips of the legs 53 with the inner face of the rim member 52 extend diagonally across the rim member. It will be noted that the direction of tilt of the outer ends 53a of the legs 53 is such that with the impeller rotating clockwise, as indicated in FIG. 3, the right hand margin 53b is the leading margin. When the impeller is installed upon the shaft 23 as shown in FIG. 2 (the direction of rotation of the impeller being as indicated in FIG. 2), it will be evident that the leading margin of each of the legs of the impeller is above the trailing edges of the legs.

In operation, a suitable amount of flavoring syrup is placed in the cup 18 and the spigot 12 is opened as previously explained. The mixer motor 22 then rotates the impeller and the frozen product drops from the spigot outlet 13 into the impeller. With the mixer impeller 24 rotating at a relatively high rate of speed the frozen product is forced downwardly through the impeller by the angle or tilt of the legs 53. This flow is not continuous but is interruped by the intersection of the impeller legs with the product stream. The product entering above the impeller is thus driven in an interrupted, axial flow at high velocity through the impeller and into the flavoring syrup in the bottom of the cup or container. This initial impacting of the viscous syrup or flavoring by the product, delivered at high velocity by the impeller, is essential in forcing the flavoring into substantially a colloidal suspension with the initial volume of product, "thinning" of the mixture by the additional volume of product subsequently delivered can then continue. The subsequent flow of product does not impinge directly on the impeller but on the vortex in the mixture created by rotation of the impeller. Circulation of subsequently entering product thus takes place centrally down through the vortex created by the impeller, through the impeller, and then upwardly along the side walls of the cup and back into the central vortex all as indicated by arrows in FIG. 2.

It should be noted that the cylindrical rim portion 51 of the impeller prevents scattering of the product against the sides of the cup and serves to protect the operator from injury to fingers or hands should they come in contact with the mixer impeller while it is rotating. The containers or cups used in applications of the type described are usually made of waxed paper and subject to tearing. The cylindrical rim portion 51 prevents damage to the cup walls should they be brought in contact to the impeller, the tilted rotating end portions 53a of the legs 53 being prevented from coming in contact with the container. The rim portion of the impeller further prevents collision of the impeller blades with hard surfaces which might damage or destroy the legs of the impeller. Speed of rotation of the impeller is important in producing the optimum results, the speed most desirable being that which is as high as possible without producing cavitation. In mixing very viscous products, cavitation is less likely to occur at lower speeds and the mixer motor may therefore be provided with a switch 22a for selecting two or more speeds for the motor 22.

While the invention has been disclosed and described in some detail in the drawings of the forgone description, they are to be considered as illustrative and not restrictive in character, as other modifications may readily suggest themselves to persons skilled in this art and within the scope of the invention, reference being had to the appended claims.

The invention claimed is:

1. In combination, an apparatus for mixing frozen comestible product with flavoring just subsequent to its delivery from a refrigerated chamber comprising a manually operable spigot for delivery of the product from the chamber, electric motor operated delivery means for providing a discharge pressure on the product, a motor driven mixer including an impeller disposed adjacent said spigot, a spigot switch actuated upon opening of said spigot, a time delay electromagnetic actuator, circuit means electrically connecting both said electromagnetic actuator and said motor operated delivery means across a source of electrical power in series with said spigot switch, a mixer motor control switch closed upon energization of said actuator and opened a predetermined time after denergization thereof, said mixer motor being connected in series with said control switch across said source of electrical power, whereby upon manual opening of said spigot said motor operated delivery means and said mixer motor are energized and upon closure of said spigot said delivery means is deenergized but said mixer motor remains energized for a predetermined time subsequent to closure of said spigot.

2. A combination as claimed in claim 1 in which means are provided for adjusting the duration of said predetermined time.

3. In combination, an apparatus for mixing frozen comestible product with flavoring just subsequent to its delivery from a refrigerated chamber comprising a manually operable spigot for delivery of the product from the chamber, electric motor operated delivery means for providing a discharge pressure on the product, a motor driven mixer including an impeller disposed adjacent said spigot, a spigot switch actuated upon opening of said spigot, an electric time delay actuator, circuit means electrically connecting both said time delay actuator and said motor operated delivery means across a source of electrical power with said circuit means being controlled by said spigot switch, a mixer motor control switch closed upon energization of said actuator and opened a predetermined time after deenergization thereof and adapted to place said mixer motor across said source of electrical power when closed, whereby upon manual opening of said spigot said motor operated delivery means and said mixer motor are energized and upon closure of said spigot said delivery means is deenergized but said mixer motor remains energized for a predetermined time subsequent to closure of said spigot.

4. A combination as claimed in claim 3 in which means are provided for adjusting the duration of said predetermined time.

References Cited by the Examiner

UNITED STATES PATENTS

| | | | |
|---|---|---|---|
| 637,452 | 11/1899 | Franklin | 259—107 |
| 660,185 | 10/1900 | Franklin | 259—97 |
| 687,182 | 11/1901 | Franklin | 259—107 |

WALTER A. SCHEEL, *Primary Examiner.*

CHARLES A. WILLMUTH, *Examiner.*